(12) United States Patent
Miyazaki et al.

(10) Patent No.: US 7,298,583 B2
(45) Date of Patent: Nov. 20, 2007

(54) DISK DRIVE HAVING HOLDING MEMBER TO SECURE CONTROL CIRCUIT BOARD EXTERNALLY MOUNTED TO DRIVE CASING

(75) Inventors: Hideyuki Miyazaki, Ome (JP); Toshikuni Sato, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 308 days.

(21) Appl. No.: 11/036,685

(22) Filed: Jan. 14, 2005

(65) Prior Publication Data

US 2006/0002005 A1 Jan. 5, 2006

(30) Foreign Application Priority Data

Jun. 30, 2004 (JP) ............................. 2004-194704

(51) Int. Cl.
*G11B 33/02* (2006.01)
(52) U.S. Cl. .................................. 360/97.01
(58) Field of Classification Search ............ 360/97.01, 360/137, 99.08; 720/648, 650; 361/685; 439/378
See application file for complete search history.

(56) References Cited

U.S. PATENT DOCUMENTS 5,768,049 A * 6/1998 Morehouse et al. ..... 360/97.01
5,822,152 A * 10/1998 Seaver et al. ............ 360/99.08
6,560,097 B2 * 5/2003 Naruo et al. ................ 361/685
6,674,608 B1 * 1/2004 Bernett .................... 360/97.01
6,767,238 B2 * 7/2004 Kitadai ....................... 439/378
2003/0081348 A1 5/2003 Watanabe et al.

FOREIGN PATENT DOCUMENTS

GB 2349734 A 11/2000
JP 2001-210058 8/2001

* cited by examiner

*Primary Examiner*—Tianjie Chen
(74) *Attorney, Agent, or Firm*—Foley & Lardner LLP

(57) ABSTRACT

A disk drive includes a casing having a mount surface. The casing houses a disk-shaped recording medium, a drive motor which supports and rotates the recording medium, a head which performs information processing for the recording medium, a head actuator configured to movably support the head and move the head relative to the recording medium. A control circuit board is arranged to overlap the mount surface of the casing. A holding seal is adhered to the control circuit board and the casing, covering a peripheral portion of the control circuit board to press the peripheral portion to the mount surface.

11 Claims, 6 Drawing Sheets

DISK DRIVE HAVING HOLDING MEMBER TO SECURE CONTROL CIRCUIT BOARD EXTERNALLY MOUNTED TO DRIVE CASING

CROSS-REFERENCE TO RELATED APPLICATIONS

This application is based upon and claims the benefit of priority from prior Japanese Patent Application No. 2004-194704, filed Jun. 30, 2004, the entire contents of which are incorporated herein by reference.

BACKGROUND OF THE INVENTION

1. Field of the Invention

The present invention relates to a disk drive having a disk for use as a recording medium.

2. Description of the Related Art

In recent years, disk drives such as magnetic disk drives, optical disk drives, etc. have been widely used as external recording devices or image recording devices for computers.

A magnetic disk drive, as a disk drive, generally comprises a casing in the shape of a rectangular box. The casing houses a magnetic disk serving as a magnetic recording medium, a spindle motor serving as a drive means for holding and rotating the magnetic disk, a plurality of magnetic heads for writing information to and reading information from the magnetic disk, a head actuator for movably supporting plural magnetic heads relative to the magnetic disk, a voice coil motor for rotating and positioning the head actuator, and a board unit having arranged thereon a head IC and the like.

A printed circuit board that controls the operations of the spindle motor, voice coil motor, and magnetic heads through the board unit is screwed to the outer surface of the casing. An interface (I/F) connector for connecting the magnetic disk drive to an external device is soldered to an end portion of the printed circuit board.

Described in Jpn. Pat. Appln. KOKAI Publication No. 2001-210058 is a magnetic disk drive in the form of a thin card which can be loaded into a card slot of a personal computer, for example. The card-shaped magnetic disk drive of this type is required to be made thinner and smaller than a conventional one. To meet this requirement, various components are mounted on a plate-shaped base, a support frame is fixed on the peripheral edge of the base, and a plate-shaped top cover is attached to the support frame. Further, a printed circuit board is arranged on the backside of the base, and an I/F connector on the printed circuit board is positioned and held by means of a dedicated fixing member on the support frame.

Miniaturization of magnetic disk drives these days is being promoted so that they can be used as recording devices for a wider variety of electronic devices, especially for smaller-sized electronic devices. For example, in a magnetic disk drive having housed therein a disk whose diameter is one inch or more, a printed circuit board, which is so arranged as to overlap the surface of a casing, can be made smaller than the area of the casing surface. However, in a magnetic disk drive having housed therein a disk whose diameter is one inch or less, the area of the casing surface on which a printed circuit board is mounted is made small due to miniaturization of a casing. Accordingly, it is required that a printed circuit board be arranged on a casing with approximately the entire casing surface covered thereby. Furthermore, in a small-sized magnetic disk drive, a thinly formed printed circuit board is arranged so as to reduce the thickness of the entire device, which undesirably weakens the device strength.

In such magnetic disk drives, peripheral edge portions of a printed circuit board can be released or detached easily, and when holding the sides of a magnetic disk drive, there is a fear that peripheral edge portions of a printed circuit board may be peeled off or broken. Especially, in miniaturizing magnetic disk drives, it is desired that the number of screw cramp portions on a printed circuit board be small. On the other hand, when the number of screw cramp portions is reduced, it becomes difficult to securely fix a printed circuit board.

BRIEF SUMMARY OF THE INVENTION

According to an embodiment of the present invention, a disk drive has a casing having a mount surface on the exterior of the casing; a disk-shaped recording medium arranged in the casing; a drive motor which supports and rotates the recording medium, and is arranged in the casing; a head which performs information processing for the recording medium; a head actuator arranged in the casing and configured to movably support the head and move the head relative to the recording medium; a control circuit board arranged to overlap the mount surface of the casing; and a holding member attached to the casing. The holding member covers at least a portion of the periphery of the control circuit board, and holding at least the portion of the periphery of the control circuit board to the mount surface.

According to another embodiment of the invention a disk drive has a casing having a mount surface; a disk-shaped recording medium arranged in the casing; a drive motor which supports and rotates the recording medium, and is arranged in the casing; a head which performs information processing for the recording medium; a head actuator arranged in the casing and configured to movably support the head and move the head relative to the recording medium; a control circuit board arranged to overlap the mount surface of the casing; and a holding seal. The holding seal is adhered to the control circuit board and the casing, and covers at least a portion of a periphery of the control circuit board to hold at least the portion of the periphery to the mount surface.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment, in which the present invention is applied to a hard disk drive (referred to as HDD, hereinafter), will be described in detail with reference to the accompanying drawings.

Figure 1:
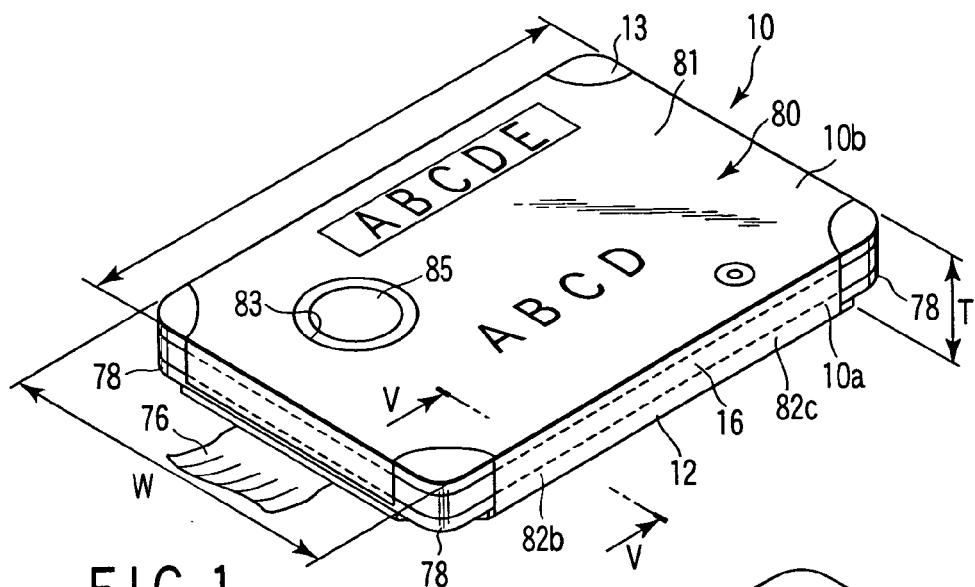
FIG. 1 shows a perspective view of an HDD according to the first embodiment of the present invention.
Figure 2:
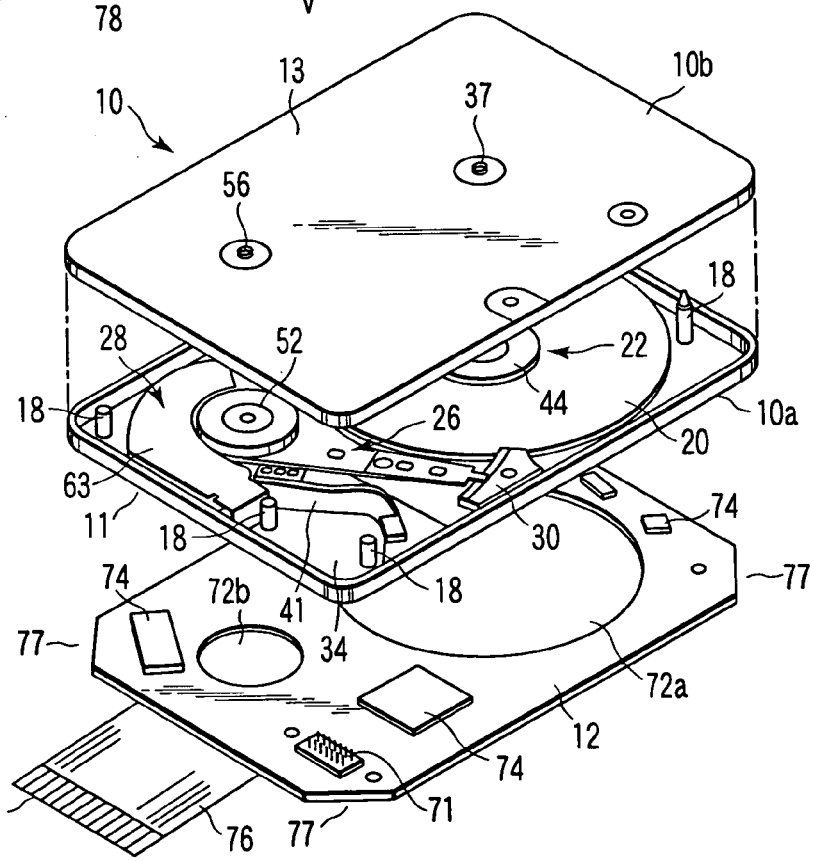
FIG. 2 shows an exploded perspective view of the HDD.

As shown in FIG. 1 and FIG. 2, the HDD comprises a casing 10 substantially in the shape of a rectangular box that houses various components, which will be mentioned later, and a rectangular control circuit board 12 that is so arranged as to overlap a mount surface of the casing 10. The casing 10 and the control circuit board 12 have a length L of 32 mm and a width W of 24 mm, and a thickness T, including thicknesses of the casing and the control circuit board, of 5 mm or 3.3 mm.

As shown in FIG. 1, FIG. 2, and FIG. 4 to FIG. 6, the casing 10 that constitutes the body of the HDD includes first and second shells 10a and 10b, which have substantially equal dimensions. The first and second shells 10a and 10b are of substantially rectangular metallic structures having sidewalls on their respective peripheral edge portions. The first and second shells 10a and 10b are so arranged as to face each other with their peripheral edge portions facing each other with the respective sidewalls in contact with one another. A belt-shaped sealing member 16 is wound around the sidewalls of the first and second shells 10a and 10b so that the peripheral edge portions are connected and sealed to each other. In this way, the casing 10 in the shape of a rectangular box is configured.

The outer surface of the first shell 10a serves as a first main surface of the casing 10, and the first main surface configures a rectangular mount surface 11. The outer surface of the second shell 10b configures a rectangular second main surface 13 of the casing 10, which is opposed to the mount surface 11. The casing 10 has its four corners including the corners of the mount surface 11 and second main surface 13 rounded, forming circular arcs. As a result, the sealing member 16 wound around the peripheral edge portions of the casing 10 is prevented from being damaged by the corners of the casing, and deterioration of airtightness due to release of the sealing member is prevented.

Figure 3:
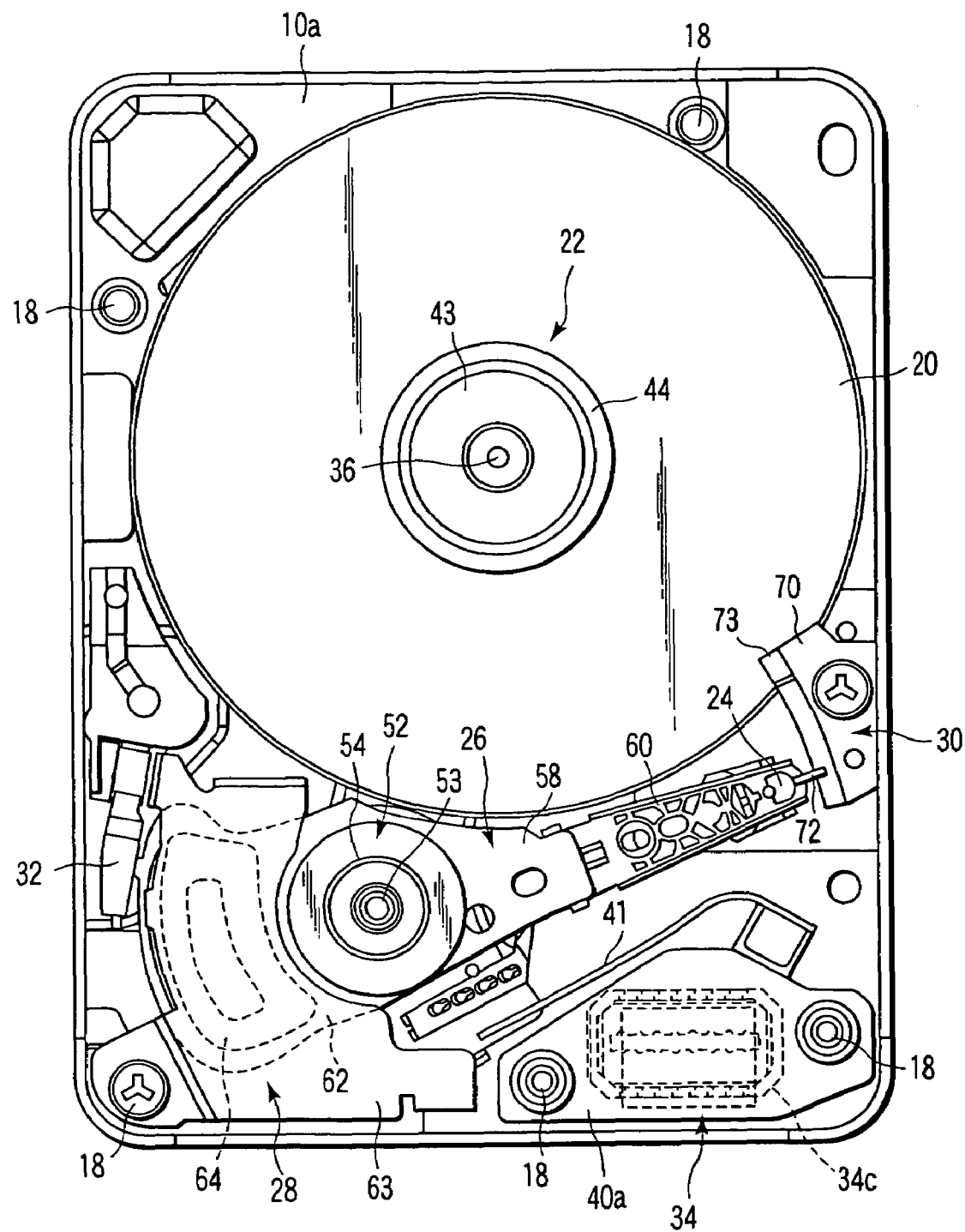
FIG. 3 shows a plan view of a casing and the internal structure of the HDD.

As shown in FIG. 2 and FIG. 3, a plurality of support posts 18 are arranged on the peripheral edge portions at the inside of the casing 10. Each support post 18 has a proximal end that is fixed to the inner surface of the first shell 10a, and is substantially perpendicular to the inner surface of the first shell. The mount surface 11 is provided with screw holes at positions corresponding to the respective support posts 18, which extend into the inside of the support posts.

The casing 10 houses a magnetic disk 20 having a diameter of, e.g., 0.85 inch and serving as an information recording medium, a spindle motor 22 serving as a drive motor for supporting and rotating the magnetic disk, magnetic heads 24 for writing information to and reading information from the magnetic disk, a carriage 26 for movably supporting the magnetic heads relative to the magnetic disk 20, a voice coil motor (referred to as VCM, hereinafter) 28 for rotating and positioning the carriage, a ramp load mechanism 30 for unloading the magnetic heads to a position away from the magnetic disk and holding the magnetic head thereat when the magnetic heads are moved to the outer peripheral portion of the magnetic disk, an electromagnetic latch 32 for holding the carriage in a retreated position, and a board unit 34 having arranged thereon a head IC etc.

The spindle motor 22 is mounted on the first shell 10a. The spindle motor 22 has a spindle 36 that is fixed to the inner surface of the first shell 10a, and is substantially perpendicular to the inner surface. The extended end of the spindle 36 is fixed to the second shell 10b by a fixing screw 37 that is screwed into the second shell from outside. Thus, the spindle 36 is supported by the first and second shells 10a and 10b from both sides.

A bearing, not shown, rotatably supports a rotor on the spindle 36. The end portion of the rotor at the side of the second shell 10b constitutes a columnar hub 43, on which the magnetic disk 20 is coaxially fitted. A clamp ring 44 in the form of a ring is fitted on the end portion of the hub 43, thereby holding the inner peripheral portion of the magnetic disk 20. Thus, the magnetic disk 20 is fixed to the rotor, which enables the magnetic disk 20 to be rotatably supported integrally with the rotor.

A ring-shaped permanent magnet, not shown, is fixed to the end portion of the rotor at the side of the first shell 10a such that the permanent magnet is coaxial with the rotor. The spindle motor 22 has a stator core, not shown, attached to the first shell 10a, and a plurality of coils wound around the stator core. The stator core and the coils are located outside the permanent magnet with a gap arranged therebetween.

The carriage 26, which constitutes a head actuator, is provided with a bearing assembly 52 that is fixed to the inner surface of the first shell 10a. The bearing assembly 52 has a pivot 53 that is perpendicularly fixed to the inner surface of the first shell 10a, and a cylindrical hub 54 that is rotatably supported by the pivot 53 using a pair of bearings. The extended end of the pivot 53 is fixed to the second shell 10b by a fixing screw 56 that is screwed into the second shell from outside. Thus, the pivot 53 is supported by the first and second shells 10a and 10b from both sides.

The carriage 26 is provided with an arm 58 extending from the hub 54, a suspension 60 in the form of an elongated plate extending from the distal end of the arm, and a support frame 62 extending from the hub 54 in a direction opposite to the extending direction of the arm. The extended end of the suspension 60 supports the magnetic head 24 through gimbals portion, not shown. A predetermined head load, brought about by spring force of the suspension 60, is applied to the magnetic head 24 in a direction toward the surface of the magnetic disk 20. A voice coil 64, constituting the VCM 28, is unitedly fixed to the support frame 62.

The VCM 28, which rotates the carriage 26 about the bearing assembly 52, includes a pair of yokes 63 which are fixed to the first shell 10a and face each other with a gap provided therebetween, and a magnet, not shown, which is fixed to the inner surface of one of the yokes and faces the voice coil 64. When the voice coil 64 is energized, the carriage 26 pivots over the surface of the magnetic disk 20, leaving from the retreated position shown in FIG. 3. Thereupon, the magnetic head 24 is positioned on a desired track of the magnetic disk 20. The electromagnetic latch 32, which is fixed to the first shell 10a, latches the carriage 26 in the retreated position, thereby preventing the carriage 26 from moving from the retreated position to the operating position when the HDD is subjected to external force such as shock.

The ramp load mechanism 30 comprises a ramp member 70 that is fixed to the inner surface of the first shell 10a and faces the outer peripheral portion of the magnetic disk 20, and a tab 72 that extends from the distal end of the suspension 60 and serves as an engaging member. The ramp member 70 is formed by bending a plate member and has a ramp surface 73 with which the tab 72 can engage. When the carriage 26 pivots from the inner peripheral portion of the magnetic disk 20 to the retreated position located around the outer peripheral portion of the magnetic disk, the tab 72 engages with the ramp surface 73 of the ramp member 70. Thereafter, the tab 72 is pulled up by the inclination of the ramp surface, whereupon the magnetic head 24 is unloaded. When the carriage 26 pivots to the retreated position, the tab 72 is supported on the ramp surface 73 of the ramp member 70, and the magnetic head 24 is kept distant from the surface of the magnetic disk 20.

The board unit 34 has a body 40a that is formed of a flexible printed circuit board, and the body 40a is fixed to the inner surface of the first shell 10a. The head IC, a head amplifier, and other electronic components are mounted on the body 40a. The board unit 34 has a main flexible printed circuit board (referred to as main FPC, hereinafter) 41 that extends from the body 40a. The extended end of the main FPC 41 is connected to the vicinity of the bearing assembly 52 of the carriage 26, and is also electrically connected to the magnetic head 24 through a cable, not shown, arranged on the arm 58 and suspension 60. A connector 34c to be connected to the control circuit board 12 is mounted on the bottom surface of the body 40a of the board unit 34. The connector 34c is exposed to the mount surface 11 of the first shell 10a through an opening provided at the first shell.

Figure 4:
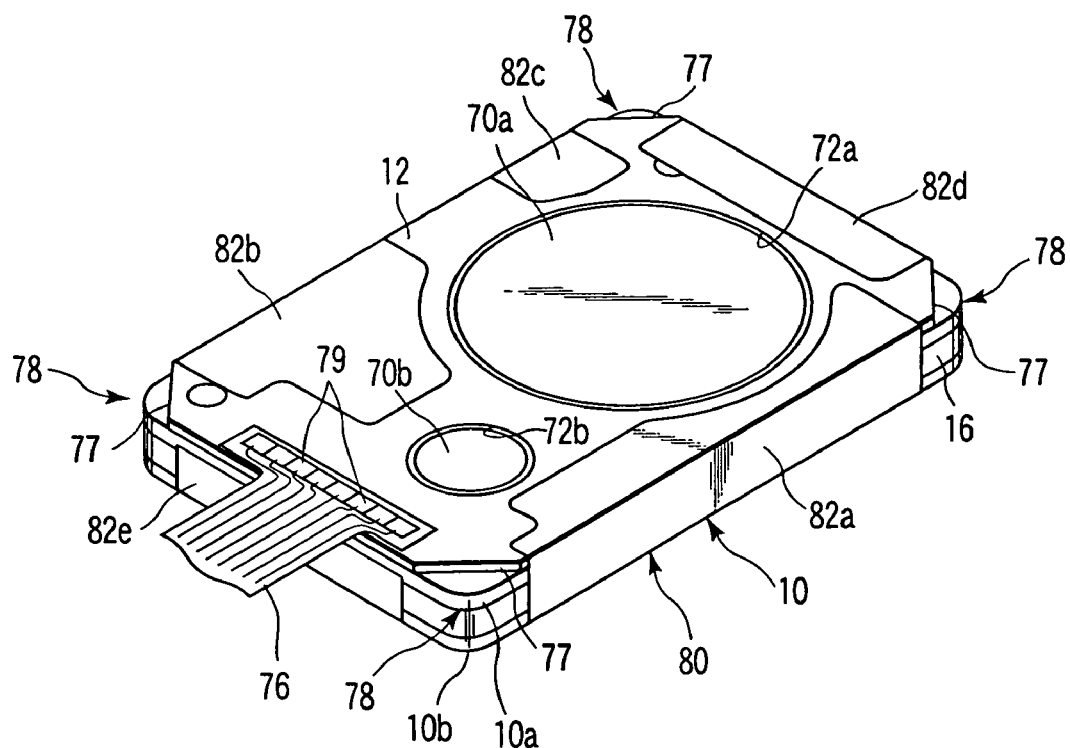
FIG. 4 shows a perspective view of the HDD when viewed from the side of a control circuit board.
Figure 6:
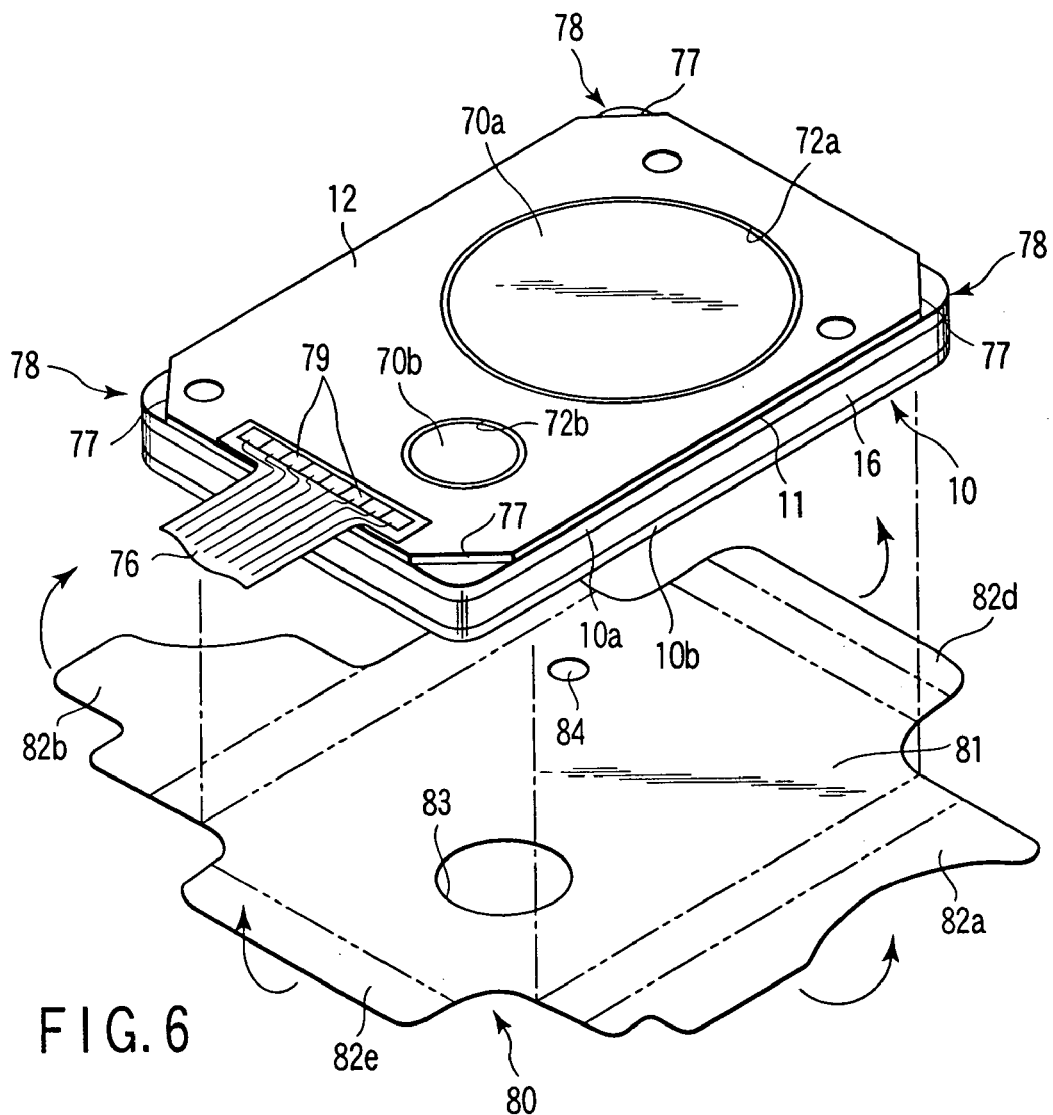
FIG. 6 shows an exploded perspective view of the casing, control circuit board, and a holding seal of the HDD.

As shown in FIG. 2, FIG. 4, and FIG. 6, the control circuit board 12 formed of a printed circuit board is of a rectangular shape whose length and width are substantially equal to those of the mount surface 11 of the casing 10. The mount surface 11 of the casing 10 has formed thereon a circular convex surface 70a corresponding to the spindle motor 22 and a circular convex surface 70b corresponding to the bearing assembly 52. The control circuit board 12 is provided with circular openings 72a, 72b corresponding to the convex surfaces 70a, 70b, respectively. Furthermore, the control circuit board 12 has mounted thereon a plurality of electronic components 74, a connector 71, and has formed thereon a plurality of connecting terminals 79 which are arranged along one of short sides thereof. A flexible printed circuit board 76 for connecting the HDD to an external device is connected to the connecting terminals 79. The flexible printed circuit board 76 is drawn from one of short sides of the control circuit board 12, and is provided with a plurality of connecting terminals 75 at the extended end thereof. The control circuit board 12 has its four corners cut off obliquely such that the respective cut-off lines form angles of 45 degrees relative to the respective sides, forming cut-off portions 77.

Thus formed control circuit board 12 is arranged to be overlapped on the mount surface 11 of the casing 10, and fixed to the first shell 10a using a plurality of screws. At this time, the four sides of the control circuit board 12 fit in with or agree with the four sides of the mount surface 11. The convex surfaces 70a, 70b formed on the mount surface 11 are arranged within the openings 72a, 72b of the control circuit board 12. The connector 71 mounted on the control circuit board 12 is connected to the connector 34c of the board unit 34.

The cut-off portions 77 formed at the four corners of the control circuit board 12 correspond to the four corners of the mount surface 11, respectively. Thus, the four corners of the mount surface 11 are exposed to outside without being covered by the control circuit board 12. The four corners of the casing 10 including the exposed four corners of the mount surface 11 configure holding potions 78 for holding the casing without coming into contact with the control circuit board 12.

Figure 5:
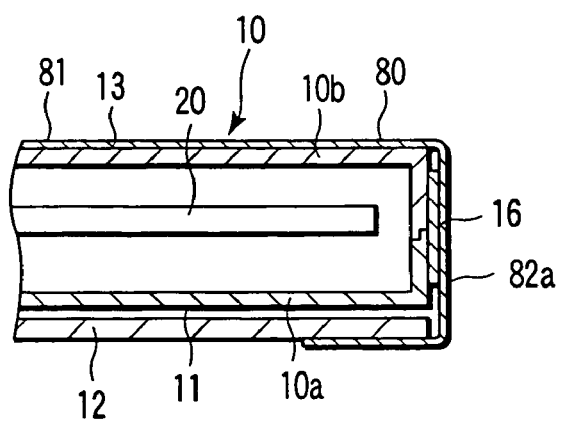
FIG. 5 shows a cross-sectional view of the HDD along a line V-V shown in FIG. 1.
Figure 7:
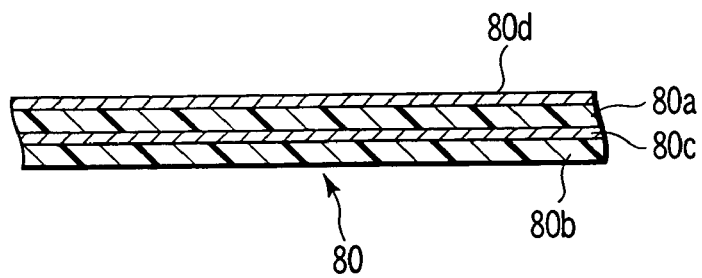
FIG. 7 shows an enlarged cross-sectional view of part of the holding seal.

As shown in FIG. 1, FIG. 4, and FIG. 5, a holding seal 80 is adhered to the outer surface of the casing 10 and the control circuit board 12. The holding seal 80 serves as a holding member, and has first and second layers 80a, 80b made of polyethylene terephthalate, a shield layer 80c arranged between the first and second layers, and an adhesive layer 80d formed on the outer surface the first layer, which are layered, as shown in FIG. 7. The shield layer 80c is formed of evaporating aluminum.

As shown in FIG. 1, FIG. 4, FIG. 5, and FIG. 6, the holding seal 80 unitedly has a rectangular main portion 81 with its dimensions made to correspond to those of the second main surface 13 of the casing 10, and a plurality of extended portions 82a, 82b, 82c, 82d, 82e extending from the four sides of the main portion. The main portion 81 is provided with a circular through hole 83 that is so located as to correspond to the position of the bearing assembly 52, and a circular through hole 84 that is so located as to correspond to the position of an air filter, not shown.

The holding seal 80 has its main portion 81 attached to substantially the entire area of the second main surface 13 with the adhesive layer 80d being in contact with the casing 10. The circular through hole 83 is located to face the bearing assembly 52. At the second main surface 13 of the casing 10, a circular cover seal 85 sealing a screw hole is attached to the position corresponding to the bearing assembly 52, and is located within the through hole 83.

The extended portion 82a is attached to the HDD to wind around the longitudinal side of the casing 10 and the longitudinal edge of the control circuit board 12, and cover the outer surface of the sealing member 16 and the longitudinal edge of the control circuit board. The extended portions 82b and 82c, which are located on the opposite side of the extended portion 82a, are attached to the HDD as to wind around the other longitudinal side of the casing 10 and the other longitudinal edge of the control circuit board 12, and cover the outer surface of the sealing member 16 and the other longitudinal edge of the control circuit board.

The extended portion 82d is attached to the HDD to wind around the shorter side of the casing 10 and the shorter edge of the control circuit board 12, and cover the outer surface of the sealing member 16 and the shorter edge of the control circuit board. The extended portion 82e is attached to the HDD to wind around the other shorter side of the casing 10, and cover the outer surface of the sealing member 16.

Accordingly, the control circuit board 12 and the casing 10 are held by the holding seal 80 such that the control circuit board 12 is pressed to the mount surface 11 with the pair of the opposing longitudinal side edges and one shorter edge located on the opposite side of the connecting terminals 79 of the control circuit board 12, excluding one shorter edge provided with the connecting terminals 79, being covered by the holding seal 80. The four corners of the casing 10 including the four corners of the control circuit board 12 are exposed to outside without being covered by the holding seal 80. As shown in FIG. 1, characters, patterns, etc. can be printed on the surface of the holding seal 80 or the outer surface of the second layer 80b, that is, the holding seal works as a label.

According to thus configured HDD, the holding seal 80 is attached to the outer surface of the casing 10 and the outer surface of the control circuit board 12. The control circuit board 12 and the casing 10 are held by the holding seal 80 such that the control circuit board 12 is pressed to the mount surface 11 with at least two facing edges of the control circuit board being covered by the holding seal 80. Thus, the peripheral edge portion of the thin control circuit board 12 of low device strength is protected by the holding seal 80, which can prevent release, peel-off, and breakdown of the peripheral edge portion of the control circuit board. Even if the number of screws for fixing the control circuit board 12 to the casing 10 is reduced, the control circuit board can be stably held by the holding seal 80. The HDD can be further miniaturized by reducing the number of screws for fixing the control circuit board 12.

In the embodiment, the holding seal 80 has the shield layer 80c. Thus, the holding seal 80 can shield noise generated from the inside of the HDD and noise breaking into the inside of the HDD from the outside, which can improve reliability of the HDD.

The casing 10 has its four corners including the four corners of the mount surface 11 rounded, and the control circuit board 12 arranged on the mount surface has its four corners cut off obliquely to form the cut-off portions 77 respectively. The four corners of the casing 10 including the exposed four corners of the mount surface 11 configure the holding potions 78 for holding the casing. Accordingly, the HDD can be mounted to an electronic device by holding the four holding potions 78 without coming into contact with the control circuit board 12. Thus, even if the control circuit board 12 is made thin, and is arranged to be overlapped on the entire area of the mount surface 11 except its four corner portions, the control circuit board is prevented from being affected by mechanical burden, and the HDD can be stably held without risking peel-off and breakdown of the control circuit board.

The first and second shells 10a and 10b that constitute the casing 10 are so supported as to face each other with a given gap defined therebetween by the support posts 18 arranged on one of the shells. Therefore, if any external force acts on the casing 10, the casing 10 and various components arranged therein can be prevented from being damaged. With use of the support posts 18, moreover, screwing positions between the first and second shells 10a and 10b can be reduced in number, and assemblability and maintainability can be improved.

The card-shaped, portable HDD constructed in this manner can be used as a recording device for various electronic devices such as a cellular phone, digital camera, video camera, personal digital assistant (PDA), etc.

In the first embodiment, the holding seal 80 has its main portion 81 attached to substantially the entire area of the second main surface 13 of the casing 10, and makes its plural extended portions wind around the sides of the casing 10 and the edges of the control circuit board 12 from the side of the second main surface.

Alternatively, the holding seal 80 may have its main portion 81 attached to substantially the entire area of the control circuit board 12, and make its plural extended portions wind around the sides of the casing 10 and the edges of the second main surface 13 from the side of the control circuit board. In the embodiment, the holding seal 80 covers the three edges of the control circuit board 12. On the other hand, circuit board holding effect can be sufficiently realized by covering at least two facing edges of the control circuit board.

Figure 8:
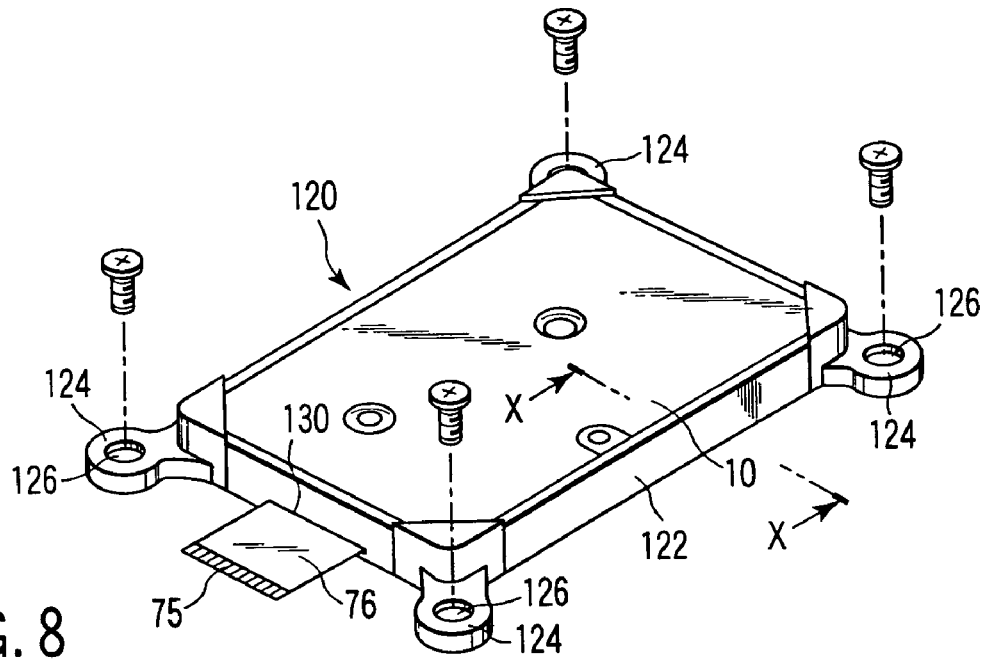
FIG. 8 shows a perspective view of an HDD according to the second embodiment of the present invention.
Figure 9:
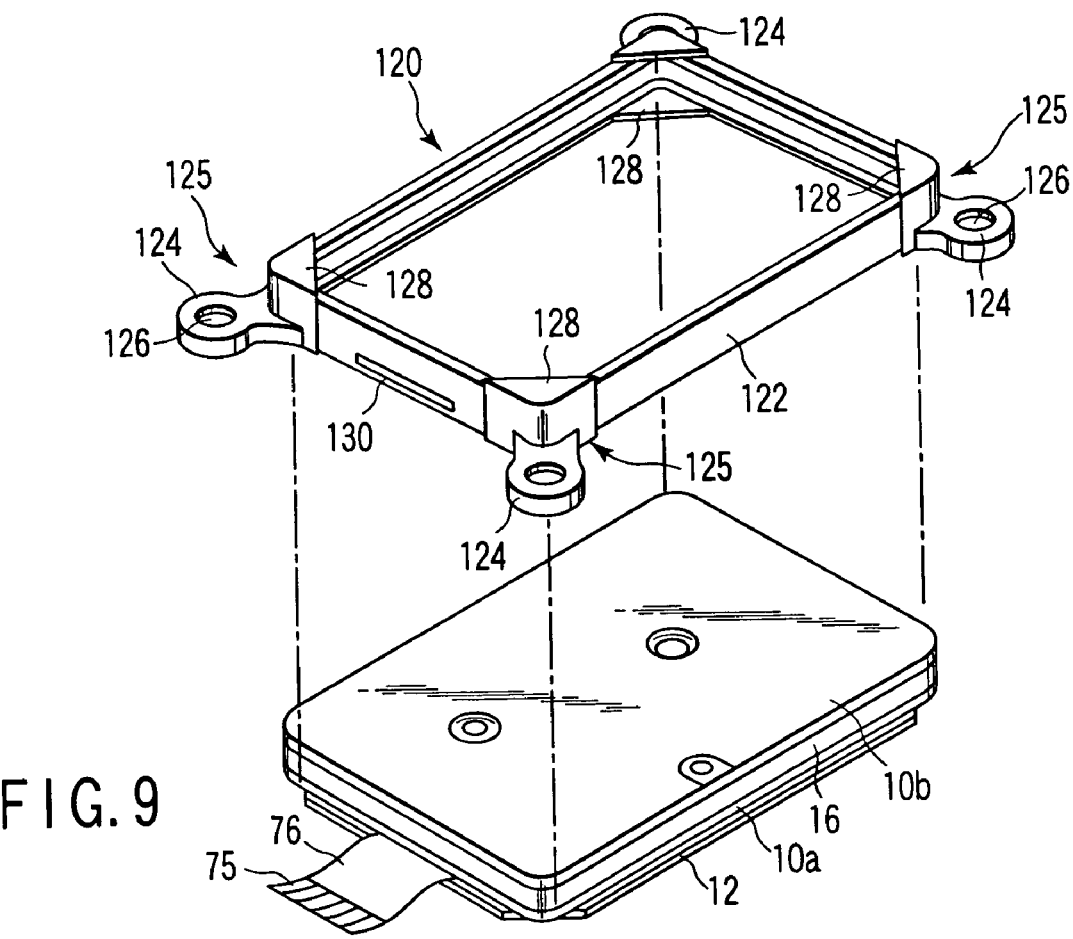
FIG. 9 shows an exploded perspective view of the HDD in the second embodiment.
Figure 10:
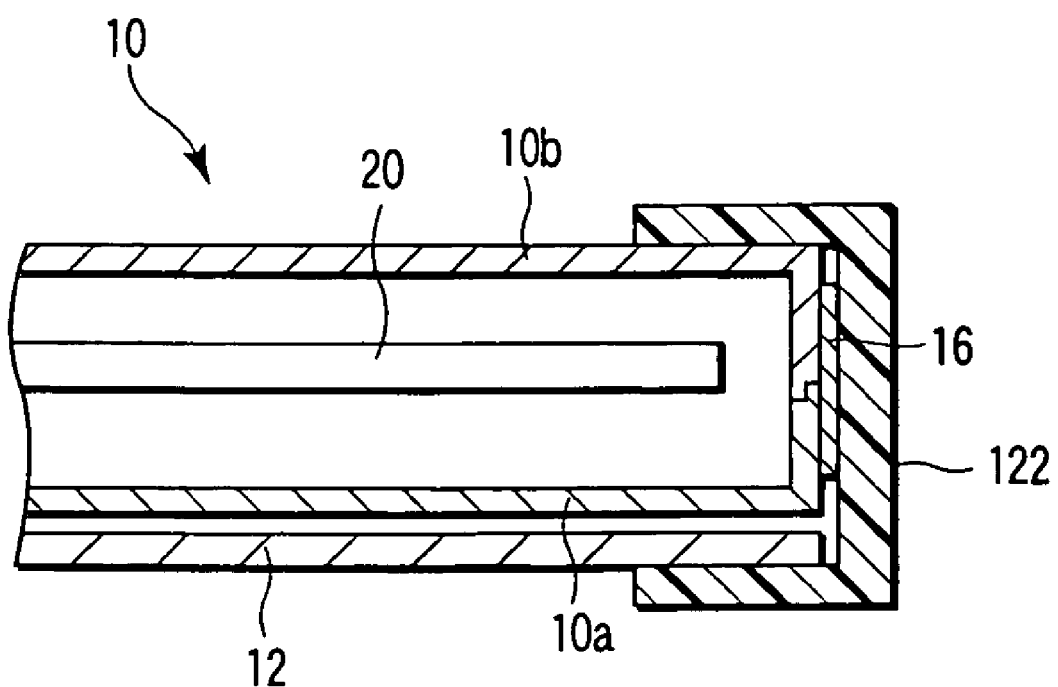
FIG. 10 shows a cross-sectional view of the HDD along a line X-X shown in FIG. 8.

As shown in FIG. 8 to FIG. 10 indicative of the second embodiment, as a holding member of the HDD, a mounting aid 120 may be used instead of the holding seal 80. The mounting aid 120 has a body 122 in the shape of a rectangular frame that is fitted around the outer peripheral portion of the casing 10 as well as around the outer peripheral portion of the control circuit board 12, and four brackets 125 which are fixed to the four corners of the body. The body 122 is made of elastic material such as rubber, synthetic resin, etc., and is elastically fitted around the outer peripheral portion of the casing 10. The body 122 has its cross-section formed into substantially a channel, and is arranged around the sealing member 16 to cover the sides of the casing 10 as well as the edges of the second main surface 13 of the casing 10 and the edges of the control circuit board 12.

The respective brackets 125 are made of rubber, synthetic resin, etc. The respective brackets 125 are fitted on the respective corners of the body 122 from outside. Each bracket 125 has a pair of engaging members 128 that extend from the top and bottom portions of the corner of the body toward the inside of the body, and a leg member 124 that extends outward. The pair of the engaging members 128 face each other with a gap therebetween. These engaging members 128 are so engaged with the casing 10 as to sandwich the holding potions 78 thereof from upward and from downward. At this time, the engaging members 128 are engaged with the casing 10 without coming into contact with the control circuit board 12. Each leg member 124 is provided with a through hole 126 through which a screw for installing the HDD to an electronic device can pass.

A slit 130 is formed at one sidewall of the body 122. The flexible printed circuit board 76, which extends from the control circuit board 12 and configures a connecting cable, is drawn out to outside through the slit 130 of the body 122.

In the second embodiment, parts or components other than the HDD are similar to those of the first embodiment, and are indicated with the same reference numerals, and detailed explanation of which will be omitted.

According to the HDD constructed as described above, the control circuit board 12 has its peripheral edge portion covered by the body 122 of the mounting aid 120, and is so held as to be pressed to the mount surface 11 of the casing 10. Thus, the peripheral edge portion of the thin control circuit board 12 of low device strength is protected by the mounting aid 120, which can prevent release, peel-off, and breakdown of the peripheral edge portion of the control circuit board. Even if the number of screws for fixing the control circuit board 12 to the casing 10 is reduced, the control circuit board can be stably held by the mounting aid 120. Moreover, the HDD can be further miniaturized by reducing the number of screws for fixing the control circuit board 12.

By attaching the mounting aid 120 to the HDD, the HDD can be mounted to a desired position in an electronic device with ease. Since the extended end of the flexible printed circuit board 76, which is provided with connecting terminals 75, is held at a predetermined position by retaining lugs 132, the HDD can be electrically connected to an electronic device easily and reliably.

It is to be understood that the present invention is not limited to the precise embodiments described above, and that various changes and modifications may be effected therein without departing from the scope or spirit of the invention. Further, various other inventions may be made by suitably combining the components described in connection with the foregoing embodiments. For example, some of the components according to the embodiments may be omitted. Further, the components according to different embodiments may be suitably combined as required.

For example, material of the holding seal is not restricted to above-described embodiment, and can be selected variedly. Furthermore, the shield layer of the holding seal can be omitted. The number of magnetic disks is not restricted to one, and can be increased according to need. The diameter of the magnetic disk is not restricted to 0.85 inch, and can be 1.5 inch or 2.5 inches. Furthermore, the control circuit board may be provided with a connector for making a connection with an external device instead of a connecting cable.

What is claimed is:

1. A disk drive comprising:
a casing having a mount surface on the exterior surface thereof;
a disk-shaped recording medium arranged in the casing;
a drive motor which supports and rotates the recording medium, and is arranged in the casing;
a head which performs information processing for the recording medium;
a head actuator arranged in the casing and configured to movably support the head and move the head relative to the recording medium;
a control circuit board arranged to overlap the mount surface of the casing; and
a holding seal adhered to the control circuit board and the casing, covering at least a portion of a periphery of the control circuit board to hold at least the portion of the periphery to the mount surface.

2. The disk drive according to claim 1, wherein
the holding seal is adhered to wind around the outer surfaces of the control circuit board and the casing, and covers at least two opposing side edges of the control circuit board.

3. The disk drive according to claim 2, wherein
the control circuit board is of a generally rectangular shape and has connecting terminals arranged along one side thereof, and
the holding seal covers two opposing side edges of the control circuit board excluding said one side of the control circuit board.

4. The disk drive according to claim 1, wherein the casing has a first main surface configuring the mount surface, and a second main surface opposed to the first main surface, and the holding seal is adhered to cover the second main surface and two opposite sides of the casing, and the portion of the periphery of the control circuit board.

5. The disk drive according to claim 1, wherein
the casing is of a generally rectangular shape and has four rounded corners including corners of the mount surface, and the control circuit board is of a generally rectangular shape and has four sides which are aligned with the respective four sides of the mount surface, and has four corners cut off obliquely so as to expose the four corners of the mount surface.

6. The disk drive according to claim 1, wherein
the casing has a first shell, and a second shell that is so arranged as to face the first shell and configures the casing together with the first shell, and the first and second shells having peripheral edge portions facing each other,
the casing has a sealing member that is wound around the peripheral edge portions of the first and second shells to seal the peripheral edge portions to each other, and
the holding seal is adhered to overlap the sealing member.

7. The disk drive according to claim 1, wherein the holding seal has a shield layer.

8. The disk drive according to claim 1, wherein the holding seal has a surface on which a label is printed.

9. The disk drive according to claim 1, wherein the casing and the control circuit board are each of a generally rectangular shape and each have a longitudinal length of approximately 32 mm, a width of approximately 24 mm, and wherein the combined thickness of the casing and the control circuit board is approximately 3.3 mm.

10. The disk drive according to claim 1 wherein said holding seal is adhered to substantially the entire surface of at least one of said control circuit board and said casing.

11. In a disk drive having a casing having a mount surface on the exterior surface thereof, a disk-shaped recording medium arranged in the casing, a drive motor which supports and rotates the recording medium, and is arranged in the casing, a head which performs information processing for the recording medium, a head actuator arranged in the casing and configured to movably support the head and move the head relative to the recording medium, and a control circuit board arranged to overlap the mount surface of the casing, a method of securing the control circuit board to the casing comprising the step of:
adhering a holding seal to at least a portion of the control circuit board and the casing, said holding seal covering at least a portion of a periphery of the control circuit board to hold the control circuit board to the mount surface of the casing.

* * * * *